Nov. 24, 1953    R. E. RISLEY ET AL    2,660,195
MULTIPLE VALVE
Filed Feb. 19, 1949
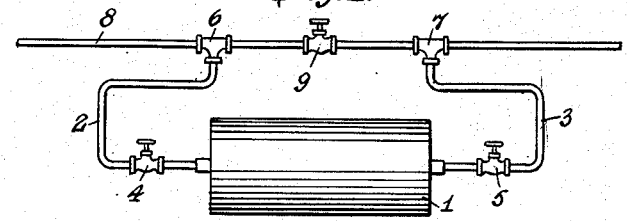
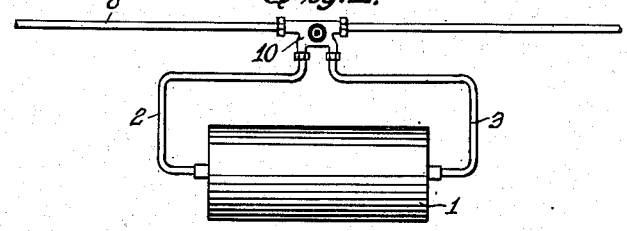
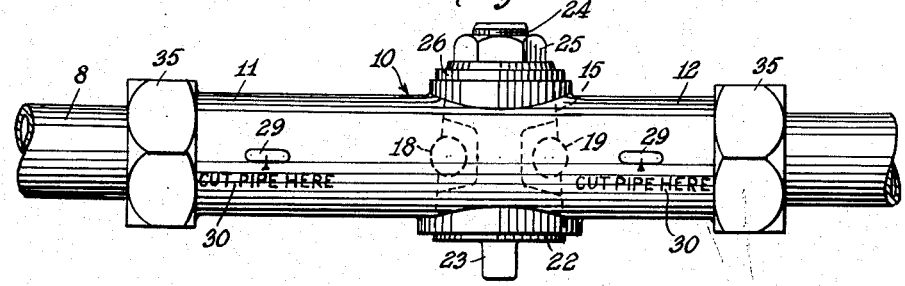
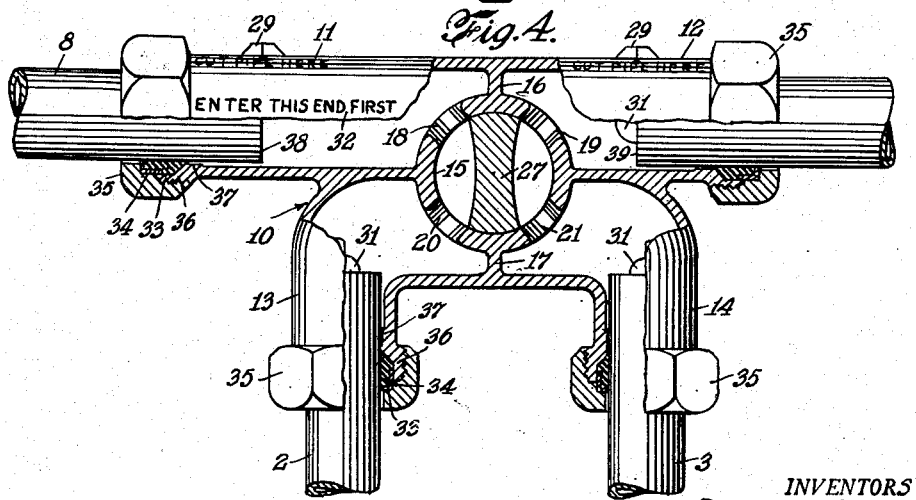
INVENTORS
ROGER E. RISLEY AND
BY   HOWARD L. HOKE
ATTORNEY Patented Nov. 24, 1953

2,660,195

UNITED STATES PATENT OFFICE 2,660,195

MULTIPLE VALVE

Roger E. Risley and Howard L. Hoke, Bradford, Pa., assignors to Dresser Industries, Inc., Cleveland, Ohio, a corporation of Pennsylvania Application August 19, 1949, Serial No. 111,110

8 Claims. (Cl. 137—599.1)

The invention relates to a multiple valve for the connection of a detour or side line to a main line and more especially to a valve for the connection of a water treatment apparatus into an existing main water line.

An object of our invention is to provide an improved valve of this character which can be quickly and easily installed in a main pipe line. Another object of our invention is to provide such a valve which is light in weight, cheap in manufacture and durable in use.

According to one feature of our invention, the body of the valve comprises a straight pipe section provided with plain end pipe coupling means, a valve chamber placed eccentrically with respect to this section, dividing the latter in two separate parts to form a short and a longer main fitting end, and comprises furthermore two side fitting ends also connected to the valve chamber. The valve chamber is provided with four ports, one opening into each fitting end, a rotary plug being mounted in this chamber, which plug has portions cut away from its body to provide passageways through said chamber cooperating with said four ports to form a two-way valve in a manner in itself well known in the art. To install the valve, a piece of pipe of the required length is cut out from the main line, the long main fitting end is shoved over one of the cut pipe ends until it is fully entered, whereafter the short main fitting end is swung into alignment with the pipe line and moved over the opposite cut end thereof until stopped by a pipe stop preferably provided in this short fitting end. When the valve has thus been properly located in the main line, the main fitting ends can be fixedly connected to the cut ends of the main pipe line by drawing up the plain end coupling means.

Other objects and features of the valve according to the invention will be apparent from the following descriptions and claims in conjunction with the accompanying drawing which illustrates by way of example an embodiment of the invention.

In the drawing:

Fig. 1 shows the connection of a water treatment apparatus to a main line in the way as hitherto commonly practised;

Fig. 2 shows such a connection by means of the valve according to the invention;

Fig. 3 shows a side elevation of the valve according to invention installed in a main pipe line, and Fig. 4 shows partly a top elevation, partly a section of the valve of Fig. 3.

In Fig. 1 there is schematically illustrated an arrangement of a water softening or water treatment apparatus cut into a main water supply line such as is commonly used in rural districts or under other circumstances where treatment of the water is required before it is consumed.

The apparatus is generally indicated by a cylinder 1 containing a filter or other treatment media, which cylinder is connected by pipe sections 2 and 3 with inlet and outlet control valves 4 and 5, and by T-fittings 6 and 7 to the main supply line 8. Between the T-fittings 6 and 7 a main valve 9 is placed in the line, which valve is closed when the cylinder is in operation.

To install the apparatus, the installer has thus to provide three valves, two T-fittings and the necessary pipe sections and has to cut extensively into the water line 8 in order to connect the two T-fittings 6 and 7 and the valve 9. When the treatment cylinder must be replaced or its contents removed for regeneration, the two valves 4 and 5 controlling the inlet and outlet of the cylinder are first shut off and the main valve 9 is opened to prevent interruption of the water supply during the changeover. Thereafter the cylinder fittings are quickly disconnected and a fresh cylinder is installed or the cylinder recharged, whereupon the system is put back into operation by again opening the valves 4 and 5 and closing the main valve 9.

The valve according to the invention provides a considerable simplification and saving in the installation and manipulation of a water treatment apparatus described in the foregoing. As shown in Fig. 2 one cut in valve 10 replaces the three valves 4, 5 and 9 and the two T-fittings 6 and 7 of Fig. 1, the valve 10 being a two-way valve which either directly cuts the cylinder 1 into the main line 8 through the side line 2, 3 or bypasses the cylinder, depending on the position of the valve plug. Thus only one valve has to be connected for the installation of the treatment cylinder and only one valve has to be manipulated when the cylinder is replaced or recharged.

The multiple valve according to the invention will now be described more in detail in conjunction with the embodiment shown in Figs. 3 and 4. It is here stated, however, that although its application has been described in connection with the installation of a water treatment apparatus, the new valve may be used in any circumstance where a detour or a side line is to be connected to an existing main line or in similar cases. In Figs. 2 and 3 the main pipe line and the two pipe sections of the detour are again designated by 8, 2 and 3 respectively.

The valve 10 has a hollow body portion made in one piece which is composed of two main connecting or main fitting ends 11 and 12 to be coupled to the main line 8, two side connecting or side fitting ends 13 and 14 to be coupled to the side lines 2 and 3 respectively, and a conical valve chamber 15 which separates the respective fitting ends from one another.

The two main fitting ends 11 and 12 are located in alignment with each other and form together a straight pipe section which is placed into the main line 8 on the installation of the valve in a manner to be described further below. The two side fitting ends 13 and 14 are bent away from this pipe section so as to stand at right angles therewith and in parallel with each other.

The valve chamber 15 is positioned eccentrically between the ends of the pipe section 11, 12, so that the fitting end 11 is longer than the short fitting end 12 as appears from the drawing. Furthermore, the valve chamber is positioned midway between the pipe section 11, 12 and the side fitting ends 13, 14 as shown, partitioned walls 16 and 17 being provided to complete the separation of the respective fitting ends.

The wall of the conical valve chamber 15 is provided with four ports 18, 19, 20 and 21 lying in the same plane and opening into the fitting ends 11, 12, 13 and 14 respectively. A closely fitting conical plug 22 is rotatably mounted in the chamber 15 closing same at the top and bottom. The plug is provided with a square head 23 at its wider end adapted to receive a wrench or key to turn the plug, and with a threaded portion 24 at its smaller end receiving a nut 25, which engages a washer 26 resting on the flat end of the chamber wall and keeping the plug tightly located in the valve chamber. The plug has two grooves cut away in its body in the same plane as the valve ports, so that a bridge portion 27 is formed which divides the interior of the valve chamber 15 into two passageways connecting either ports 18 and 20 on one side and ports 19 and 21 on the other side (see Fig. 4) or connecting ports 18 and 19 and ports 20 and 21, depending on the position of the plug. Thus, a two-way valve is obtained which may either directly connect the main fitting ends 11 and 12 in the main fitting line, bypassing the detour 2, 3, or cut the detour into the main line.

To facilitate the installation of the valve, the straight pipe section 11, 12 to be inserted in the main pipe line is provided with two spaced indexing projections 29 cast into the valve body to indicate the length of pipe to be cut out from the main line. These projections may be accompanied by an engraved text 30 such as "Cut pipe here." In Fig. 4 the cut pipe ends of the main pipe 8 so obtained are designated by 38, 39 respectively.

As shown, the fitting end 12 and also the fitting ends 13 and 14 are provided with pipe stops 31 projecting from their inner wall at a suitable distance from their open ends. These fitting ends are kept as short as is constructionally advisable so as to save material and weight. The fitting end 11, however, is somewhat longer than the end 12 and has no inner pipe stop. This larger end is to be entered first into the cut main line and may be provided with a suitable marking 32 to indicate this, such as the engraved words "Enter this end first." The fitting end 11 has such a length that when it is fully entered in the main pipe line after the required length of pipe has been cut therefrom, the fitting end 12 can be swung into alignment with the opposite cut pipe end 39 and moved over this end until stopped by the pipe stop 31, in which position the fitting end 11 still surrounds the other cut pipe end 38 over a sufficient length to insure a dependable coupling to be made.

The fitting ends 11 and 12 are provided with suitable plain end pipe coupling means so that the cut pipe ends 38, 39 of the main line need not be threaded or worked. Preferably the side fitting ends 13 and 14 are provided with the same kind of coupling means as the main fitting ends.

In the embodiment shown these coupling means comprise an annular gasket 33 bevelled at one end, a gasket retainer cup 34 and a hexagonal end nut 35. The fitting end has a threaded end portion 36 of greater diameter adapted to receive the nut 35, which end portion encloses a gasket recess adapted to receive the bevelled gasket 33. When the end nut 35 is drawn up it engages the gasket retainer 34 partially enclosing the gasket 33 and thereby presses the latter into the gasket recess for sealing engagement with the end portion 36 and the outer wall of the pipe end introduced in the fitting end. To provide for some deflection of the pipe ends with respect to the valve fitting ends, the inner diameter of the fitting ends is made somewhat larger than the outer diameter of the pipe and an inwardly projecting annular ridge 37 is provided to properly bound the gasket recess on its inner side.

To install the valve according to the invention in an existing pipe line, first a piece of pipe is cut out from the main line 8 having the same measured length as the distance between the two markings 29 whereby the two plain cut pipe ends 38 and 39 are obtained. The loose nuts 35, gasket retainers 34 and gaskets 33 of the main fitting ends 11 and 12 are then in this sequence placed around these two cut pipe ends and the long fitting end 11 marked "Enter this end first" is moved so far around one of these cut pipe ends, e. g. the end 38, until the fitting end 12 can be swung in alignment with the opposite cut pipe end 39. In this position the fitting end 11 is fully entered, the cut pipe end 38 approximately abutting the wall of the valve chamber 15. The fitting end 12 may now be moved back over the pipe end 39 until stopped by the pipe stop 31, in which position the fitting end 11 surrounds the pipe end 38 over approximately the same length as the fitting end 12 the pipe end 39. Lastly, the couplings are assembled on the fitting ends 11 and 12 and the nuts 35 tightened, whereafter the side pipe lines 2 and 3 can be coupled to the fitting ends 13 and 14 in the known manner.

It will be clear from the foregoing that the new valve on account of the plain end coupling means and the other features described, can be installed very quickly and easily in a main line, making only a short interruption of the water supply necessary. The valve is of compact construction, the provision of a short and a longer main fitting end making it possible to save some material in the body casting and also allowing a shorter piece to be cut out of the main line than would be required if the ends were of the same length.

Although the invention has been described in conjunction with a special embodiment thereof, it will be understood that various modifications in form and construction or possibly within the scope of the following claims.

What we claim and desire to secure by Letters Patent is:

1. A multiple valve for connecting a detour to a main line for a water softener installation and the like and adapted to be installed between two opposed ends of said main line from between which a section of predetermined length has been removed, comprising a body portion consisting of a straight pipe section, a valve chamber located eccentrically with respect to the ends of said pipe section, dividing said section into two separate parts to form a short fitting end and a longer main fitting end and preventing flow between said fitting ends except through said valve chamber, two side fitting ends connected to said valve chamber, said chamber opening with a port into each of said four fitting ends, a rotary plug mounted in said valve chamber, said plug having portions cut away from its body to form passageways through said chamber cooperating with said four ports to permit selective connection of said two main fitting ends and each main fitting end to one side fitting end depending upon the position of the plug, the portion of said plug body between said passageways having a width at least as great as the diameter of said ports whereby to close a port communicating with one of said side fitting ends and a port communicating with one of said main fitting ends when placed in alignment therewith, thereby permitting the interruption of all communication among said fitting ends, indicia on said straight pipe section indicating the length of said section of predetermined length of the main line, a marking on said longer main fitting end to indicate that this end is to be placed first around one of the cut ends of the main pipe line, said longer fitting end having a length which permits said pipe section, when fully entered, to be swung into alignment with said main line and thereupon said short main fitting end to be moved over the other cut end of the main pipe line until both main fitting ends surround the main pipe, a pipe stop projecting from the inner wall of said short main fitting end, and plain end pipe coupling means on each of said four fitting ends comprising an annular gasket, a gasket retainer cup and a nut threaded onto each fitting end and engaging said retainer to press said gasket into sealing engagement with the fitting end and with the outer wall of the pipe end introduced therein.

2. A multiple valve for connecting a detour to a main line for a water softener installation and the like and adapted to be installed between two opposed ends of said main line from between which a section of predetermined length has been removed, comprising a body portion consisting of a straight pipe section, a valve chamber located eccentrically with respect to the ends of said pipe section, dividing said section into two separate parts to form a short fitting end and a longer main fitting end preventing flow between said fitting ends except through said valve chamber, two side fitting ends connected to said valve chamber, said chamber opening with a port into each of said four fitting ends, a rotary plug mounted in said valve chamber, said plug having portions cut away from its body to form passageways through said chamber cooperating with said four ports to permit selective connection of said two main fitting ends and each main fitting end to one side fitting end depending on the position of the plug, the portion of said plug body between said passageways having a width at least as great as the diameter of said ports whereby to close a port communicating with one of said side fitting ends and a port communicating with one of said main fitting ends when placed in alignment therewith, thereby permitting the interruption of all communication among said fitting ends, said longer main fitting end having a length which permits said pipe section, when fully entered, to be swung into alignment with said main line, a pipe stop projecting from the inner wall of said main fitting end, and plain end pipe coupling means on said main fitting ends comprising an annular gasket, a gasket retainer cup and a nut threaded onto each fitting end and engaging said gasket retainer to press said gasket into sealing engagement with the fitting end and with the outer wall of the pipe end introduced therein.

3. A multiple valve for connecting a detour to a main line for a water softener installation and the like and adapted to be installed between two opposed ends of said main line from between which a section of predetermined length has been removed, comprising a body portion consisting of a straight pipe section, a valve chamber located eccentrically with respect to the ends of said pipe section, dividing said section into two separate parts to form a short fitting end and a longer main fitting end and preventing flow between said fitting ends except through said valve chamber, two side fitting ends connected to said valve chamber, said chamber opening with a port into each of said four fitting ends, a rotary plug mounted in said valve chamber, said plug having portions cut away from its body to form passageways through said chamber cooperating with said four ports to permit selective connection of said two main fitting ends and each main fitting end to one side fitting end depending upon the position of the plug, the portion of said plug body between said passageways having a width at least as great as the diameter of said ports whereby to close a port communicating with one of said side fitting ends and a port communicating with one of said main fitting ends when placed in alignment therewith, thereby permitting the interruption of all communication among said fitting ends, indicia on said straight pipe section indicating the length of said section of predetermined length of the main line, a marking on said longer main fitting end to indicate that this end is to be placed first around one of the cut ends of the main pipe line, said longer fitting end having a length which permits said pipe section, when fully entered, to be swung into alignment with said main line and thereupon said short main fitting end to be moved over the other cut end of the main pipe line until both main fitting ends surround the main pipe, a pipe stop projecting from the inner wall of said short main fitting end, and plain end pipe coupling means on said two main fitting ends.

4. A multiple valve for connecting a detour to a main line for a water softener installation and the like and adapted to be installed between two opposed ends of said main line from between which a section of predetermined length has been removed, comprising a body portion consisting of a straight pipe section, a valve chamber located eccentrically with respect to the ends of said pipe section, dividing said section into two separate parts to form a short fitting end and a longer main fitting end preventing flow between said fitting ends except through said valve chamber, two side fitting ends connected to said valve chamber, said chamber opening with a port into each of said four fitting ends, a rotary plug mounted in said valve chamber, said plug having portions cut away from its body to form passageways through said chamber cooperating with said four ports to permit selective connection of said two main fitting ends and each main fitting end to one side fitting end depending on the position of the plug, the portion of said plug body between said passageways having a width at least as great as the diameter of said ports whereby to close a port communicating with one of said side fitting ends and a port communicating with one of said main fitting ends when placed in alignment therewith, thereby permitting the interruption of all communication among said fitting ends, said longer main fitting end having a length which permits said pipe section, when fully entered to be swung into alignment with said main line, and thereupon said short main fitting end to be moved over the other cut end of the main pipe line until both these fitting ends surround the main line, a pipe stop projecting from the inner wall of said short main fitting end and plain end pipe coupling means on said two main fitting ends.

5. A multiple valve for connecting a detour to a main line for a water softener installation and the like and adapted to be installed between two opposed ends of said said main line from between which a section of predetermined length has been removed, comprising a body portion consisting of a straight pipe section, a valve chamber located eccentrically with respect to the ends of said pipe section, dividing said section into two separate parts to form a short fitting end and a longer main fitting end and preventing flow between said fitting ends except through said valve chamber, two side fitting ends connected to said valve chamber, said chamber opening with a port into each of said four fitting ends, a rotary plug mounted in said valve chamber, said plug having portions cut away from its body to form passageways through said chamber cooperating with said four ports to permit selective connection of said two main fitting ends and each main fitting end to one side fitting end depending upon the position of the plug, the portion of said plug body between said passageways having a width at least as great as the diameter of said ports whereby to close a port communicating with one of said side fitting ends and a port communicating with one of said main fitting ends when placed in alignment therewith, thereby permitting the interruption of all communication among said fitting ends, indicia on said straight pipe section indicating the length of said section of predetermined length of the main line, a pipe stop projecting from the inner wall of said short main fitting end, and plain end pipe coupling means on said two main fitting ends.

6. A multiple valve for connecting a detour to a main line for a water softener installation and the like and adapted to be installed between two opposed ends of said main line from between which a section of predetermined length has been removed, comprising a body portion consisting of a straight pipe section, a valve chamber located eccentrically with respect to the ends of said pipe section, dividing said section into two separate parts to form a short fitting end and a longer main fitting end and preventing flow between said fitting ends except through said valve chamber, two side fitting ends connected to said valve chamber, said chamber opening with a port into each of said four fitting ends, a rotary plug mounted in said valve chamber, said plug having portions cut away from its body to form passageways through said chamber cooperating with said four ports to permit selective connection of said two main fitting ends and each main fitting end to one side fitting end depending upon the position of the plug, the portion of said plug body between said passageways having a width at least as great as the diameter of said ports whereby to close a port communicating with one of said side fitting ends and a port communicating with one of said main fitting ends when placed in alignment therewith, thereby permitting the interruption of all communication among said fitting ends, a pipe stop projecting from the inner wall of said short main fitting end, and plain end pipe coupling means on said two main fitting ends.

7. In a pipe line installation for a water softener and the like, a main line pipe having two spaced-apart pipe ends and a branch line having two spaced-apart pipe ends, a multiple valve secured in fluid-tight relationship to the pipe ends of said main line pipe and the pipe ends of said branch line pipe, said valve comprising a body portion consisting of a straight pipe section, a valve chamber located eccentrically with respect to the ends of said pipe section, dividing said section into two separate parts to form a short fitting end and a longer main fitting end and preventing flow between said fitting ends except through said valve chamber, two side fitting ends connected to said valve chamber, said chamber opening with a port into each of said four fitting ends, a rotary plug mounted in said valve chamber, said plug having portions cut away from its body to form passageways through said chamber cooperating with said four ports to permit selective connection of said two main fitting ends and each main fitting end to one side fitting end depending upon the position of the plug, the portion of said plug body between said passageways having a width at least as great as the diameter of said ports whereby to close a port communicating with one of said side fitting ends and a port communicating with one of said main fitting ends when placed in alignment therewith, thereby permitting the interruption of all communication among said fitting ends, indicia on said straight pipe section indicating the length of said section of predetermined length of the main line, a marking on said longer main fitting end to indicate that this end is to be placed first around one of the cut ends of the main pipe line, said longer fitting end having a length which permits said pipe section, when fully entered, to be swung into alignment with said main line and thereupon said short main fitting end to be moved over the other cut end of the main pipe line until both main fitting ends surround the main pipe, a pipe stop projecting from the inner wall of said short main fitting end, and plain end pipe coupling means on each of said four fitting ends comprising an annular gasket, a gasket retainer cup and a nut threaded onto each fitting end and engaging said retainer to press said gasket into sealing engagement with the fitting end and with the outer wall of the pipe end introduced therein.

8. In a pipe line installation for a water softener and the like, a main line pipe having two spaced-apart pipe ends and a branch line having two spaced-apart pipe ends, a multiple valve secured in fluid-tight relationship to the pipe ends of said main line pipe and the pipe ends of said branch line pipe, said valve comprising a body portion consisting of a straight pipe section, a valve chamber located eccentrically with respect to the ends of said pipe section, dividing said section into two separate parts to form a short fitting end and a longer main fitting end and preventing flow between said fitting ends except through said valve chamber, two side fitting ends connected to said valve chamber, said chamber opening with a port into each of said four fitting ends, a rotary plug mounted in said valve chamber, said plug having portions cut away from its body to form passageways through said chamber cooperating with said four ports to permit selective connection of said two main fitting ends and each main fitting end to one side fitting end depending upon the position of the plug, the portion of said plug body between said passageways having a width at least as great as the diameter of said ports whereby to close a port communicating with one of said side fitting ends and a port communicating with one of said main fitting ends when placed in alignment therewith, thereby permitting the interruption of all communication among said fitting ends, indicia on said straight pipe section indicating the length of said section of predetermined length of the main line, a marking on said longer main fitting end to indicate that this end is to be placed first around one of the cut ends of the main pipe line, said longer fitting end having a length which permits said pipe section, when fully entered, to be swung into alignment with said main line and thereupon said short main fitting end to be moved over the other cut end of the main pipe line until both main fitting ends surround the main pipe, a pipe stop projecting from the inner wall of said short main fitting end, and plain end pipe coupling means on said two main fitting ends.

ROGER E. RISLEY.
HOWARD L. HOKE.

References Cited in the file of this patent

UNITED STATES PATENTS

| Number | Name | Date |
|---|---|---|
| 631,868 | Fowler | Aug. 29, 1899 |
| 666,316 | Kenneally | Jan. 22, 1901 |
| 879,492 | Richardson | Feb. 18, 1908 |
| 925,692 | Gold | June 22, 1909 |
| 1,169,734 | Priest | Jan. 25, 1916 |
| 1,620,717 | Brice | Mar. 15, 1927 |
| 1,940,720 | Madsen | Dec. 26, 1933 |
| 2,113,775 | Van Vulpen | Apr. 12, 1938 |

FOREIGN PATENTS

| Number | Country | Date |
|---|---|---|
| 13,963 | Great Britain | of 1888 |
| 162,221 | Switzerland | of 1933 |